(12) United States Patent
Sarrigeorgidis

(10) Patent No.: US 10,135,554 B1
(45) Date of Patent: Nov. 20, 2018

(54) ROBUST SUPER-RESOLUTION PROCESSING FOR WIRELESS RANGING

(71) Applicant: Apple Inc., Cupertino, CA (US)

(72) Inventor: Konstantinos Sarrigeorgidis, Sunnyvale, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 15/912,668

(22) Filed: Mar. 6, 2018

Related U.S. Application Data

(63) Continuation of application No. 15/864,038, filed on Jan. 8, 2018.

(60) Provisional application No. 62/513,596, filed on Jun. 1, 2017.

(51) Int. Cl.
| | |
|---|---|
| *H04B 17/382* | (2015.01) |
| *H04W 16/14* | (2009.01) |
| *H04B 7/08* | (2006.01) |
| *H04B 17/26* | (2015.01) |
| *H04B 1/10* | (2006.01) |

(52) U.S. Cl.
CPC ......... *H04B 17/382* (2015.01); *H04B 1/1027* (2013.01); *H04B 7/08* (2013.01); *H04B 17/26* (2015.01); *H04W 16/14* (2013.01)

(58) Field of Classification Search
CPC .............................. H04B 17/382; H04B 17/26
See application file for complete search history.

(56) References Cited

U.S. PATENT DOCUMENTS

| | | | |
|---|---|---|---|
| 7,221,913 B2 * | 5/2007 | Golden | G01S 5/0215 |
| | | | 342/357.66 |
| 8,463,195 B2 | 6/2013 | Shellhammer | |
| 2016/0124073 A1 | 5/2016 | Kwak et al. | |
| 2016/0282447 A1 * | 9/2016 | Amizur | H04W 24/00 |

* cited by examiner

*Primary Examiner* — Tuan H Nguyen
(74) *Attorney, Agent, or Firm* — Meyertons Hood Kivlin Kowert & Goetzel, P.C.; Steven E. Stupp

(57) ABSTRACT

An interface circuit in an electronic device may receive samples of wireless signals in a time interval, where the wireless signals are associated with the second electronic device. Then, the interface circuit may generate, based at least in part on the samples and a number of paths in a channel in a wireless environment of the electronic device, a signal spectrum corresponding to a set of estimated wireless-communication parameters. Moreover, the interface circuit may select a lower wireless-communication parameter in the set of wireless-communication parameters having an associated regression model with a fit to the signal spectrum that exceeds a statistical confidence threshold. Next, the interface circuit may identify, based at least in part on the selected lower wireless-communication parameter, samples of the wireless signal in the wireless signals associated with the line of sight between the electronic device and the second electronic device.

20 Claims, 8 Drawing Sheets

ROBUST SUPER-RESOLUTION PROCESSING FOR WIRELESS RANGING

CROSS REFERENCE TO RELATED APPLICATIONS

This application claims priority under 35 U.S.C. 120 to U.S. Non-Provisional application Ser. No. 15/864,038, "Robust Super-Resolution Processing for Wireless Ranging," Konstantinos Sarrigeorgidis, filed on Jan. 8, 2018, and under 35 U.S.C. 119(e) to U.S. Provisional Application Ser. No. 62/513,596, "Robust Time of Arrival Estimation Using Regression," by Konstantinos Sarrigeorgidis, filed on Jun. 1, 2017, the contents of both of which are herein incorporated by reference.

FIELD

The described embodiments relate, generally, to wireless communications among electronic devices, and techniques for identifying samples associated with line-of-sight communication in a wireless environment.

BACKGROUND

Multipath signals in a wireless environment can result in interference and degraded communication performance. In principle, based on received wireless signals as a function of time and space (in communications systems with spatial diversity), wireless-communication parameters such as the time of arrival can be estimated. For example, a superposition of wireless signals having different time delays in the time domain results in a summation of exponentials in the frequency domain. Consequently, for well-separated frequencies, Fourier techniques can be used to estimate the minimum time of arrival, and thus to identify the wireless signals associated with line-of-sight communication.

In many applications, the frequency or tone separations are close to the Fourier resolution. This often requires the use of so-called 'high-resolution techniques' to identify the wireless signals associated with line-of-sight communication. For example, a covariance matrix based on the wireless signals can be used to deconvolve the wireless signals in a multipath wireless environment, and thus to identify the wireless signals associated with line-of-sight communication.

However, it can be difficult to determine the covariance matrix. In particular, there is often insufficient data available to uniquely determine the covariance matrix. For example, in order to determine the covariance matrix uniquely, multiple instances or repetitions of the wireless signals may need to be acquired. In time-sensitive applications, such repeated measurements are unavailable. Consequently, the determination of the covariance matrix may be underdetermined, which can complicate and confound attempts at identifying the wireless signals associated with line-of-sight communication. In turn, the resulting errors may degrade the communication performance, which is frustrating for users.

SUMMARY

Some embodiments that relate to an electronic device that identifies wireless signals associated with a line of sight between the electronic device and a second electronic device is described. This electronic device may include one or more nodes that can be communicatively coupled to one or more antennas, and an interface circuit that is communicatively coupled to one or more nodes and that communicates with the second electronic device. During operation, the interface circuit may receive samples of wireless signals in a time interval, where the wireless signals are associated with the second electronic device. The interface circuit may generate, based at least in part on the samples and a number of paths in a channel in a wireless environment of the electronic device, a signal spectrum corresponding to a set of estimated wireless-communication parameters. Moreover, the interface circuit may select a lower wireless-communication parameter in the set of wireless-communication parameters that has an associated regression model with a fit to the signal spectrum that exceeds a statistical confidence threshold. Next, the interface circuit may identify, based at least in part on the selected lower wireless-communication parameter, samples of the wireless signal in the wireless signals associated with the line of sight between the electronic device and the second electronic device.

Note that the samples may include single instances of one or more multipath signals associated with the number of paths.

Moreover, the wireless-communication parameters may include times of arrival of the wireless signals, angles of arrival of the wireless signals, and/or amplitudes of the wireless signals.

Furthermore, the set of estimated wireless-communication parameters may be based at least in part on a moving-average covariance matrix of channel estimates that are based at least in part on the samples. For example, the moving average may be computed forward and/or backward in time. Additionally, the signal spectrum may be computed based at least in part on an eigenvalue decomposition of the moving-average covariance matrix. In some embodiments, the signal spectrum is based at least in part on multiple signal classification (MUSIC) analysis of the eigenvectors determined in the eigenvalue decomposition.

Note that the wireless-communication parameter may be selected from the set of wireless-communication parameters based at least in part on hypothesis testing.

Moreover, the communication with the second electronic device may involve ultrawide-band communication. However, a wide variety of bands of frequencies can be used.

In some embodiments, the interface circuit determines a distance between the electronic device and the second electronic device based at least in part on the identified samples.

Other embodiments provide an interface circuit in the electronic device.

Other embodiments provide a computer-readable storage medium for use with the interface circuit in the electronic device. When executed by the interface circuit, the computer-readable storage medium may cause the electronic device to perform at least some of the aforementioned operations of the interface circuit in the electronic device.

Other embodiments provide a method for identifying wireless signals associated with a line of sight between an electronic device and a second electronic device. The method includes at least some of the aforementioned operations performed by the interface circuit in the electronic device.

This Summary is provided for purposes of illustrating some exemplary embodiments, so as to provide a basic understanding of some aspects of the subject matter described herein. Accordingly, it will be appreciated that the above-described features are only examples and should not be construed to narrow the scope or spirit of the subject matter described herein in any way. Other features, aspects, and advantages of the subject matter described herein will become apparent from the following Detailed Description, Figures, and Claims.

BRIEF DESCRIPTION OF THE DRAWINGS

The included drawings are for illustrative purposes and serve only to provide examples of possible structures and arrangements for the disclosed systems and techniques for intelligently and efficiently managing communication between multiple associated user devices. These drawings in no way limit any changes in form and detail that may be made to the embodiments by one skilled in the art without departing from the spirit and scope of the embodiments. The embodiments will be readily understood by the following detailed description in conjunction with the accompanying drawings, wherein like reference numerals designate like structural elements.

Note that like reference numerals refer to corresponding parts throughout the drawings. Moreover, multiple instances of the same part are designated by a common prefix separated from an instance number by a dash.

DETAILED DESCRIPTION

Figure 1:
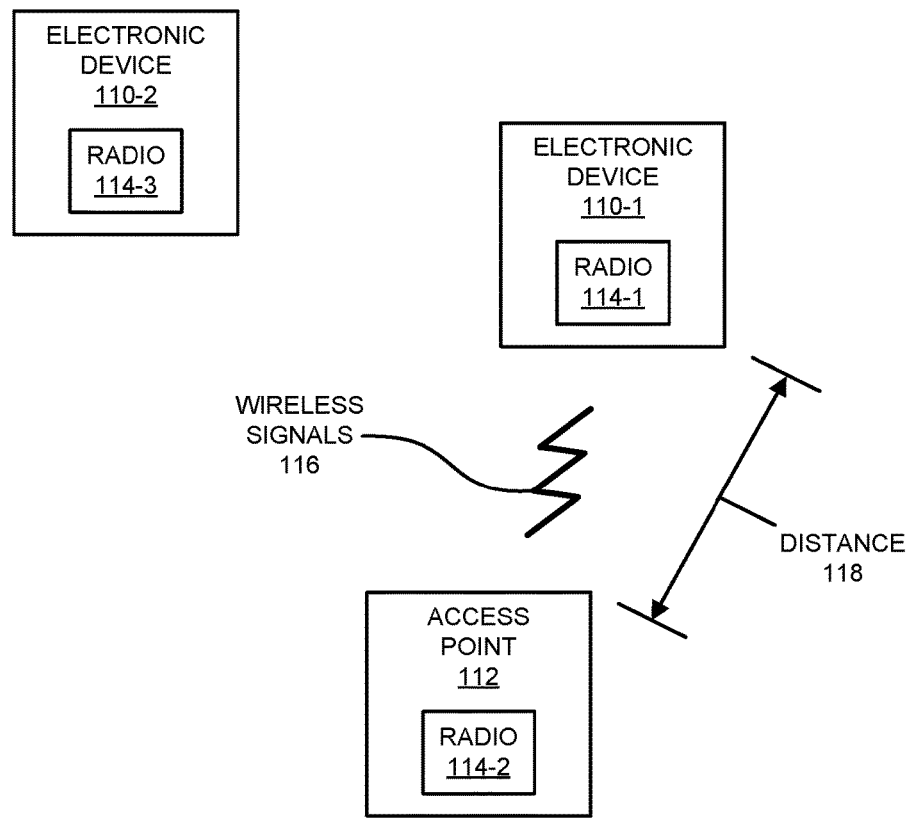
FIG. 1 is a block diagram illustrating an example of electronic devices communicating wirelessly.

An interface circuit in an electronic device may receive samples of wireless signals in a time interval, where the wireless signals are associated with the second electronic device. Then, the interface circuit may generate, based at least in part on the samples and a number of paths in a channel in a wireless environment of the electronic device, a signal spectrum corresponding to a set of estimated wireless-communication parameters. Moreover, the interface circuit may select a lower (such as a minimum) wireless-communication parameter in the set of wireless-communication parameters that has an associated regression model with a fit to the signal spectrum that exceeds a statistical confidence threshold. The interface circuit may identify, based at least in part on the selected lower wireless-communication parameter, samples of the wireless signal in the wireless signals associated with the line of sight between the electronic device and the second electronic device.

By identifying the samples, this communication technique may reduce the impact of multipath signals. For example, the communication technique may allow the electronic device to accurately determine the distance between the electronic device and the second electronic device, e.g., based at least in part on the identified samples. More generally, the communication technique may improve the communication performance by allowing the electronic device to select the lower wireless-communication parameter, such as the time of arrival of the wireless signal, the angle of arrival of the wireless signal, and/or the amplitude of the wireless signal. Consequently, the communication technique may improve the user experience when using the electronic device, and thus may increase customer satisfaction and retention.

Note that the communication technique may be used during wireless communication between electronic devices in accordance with a communication protocol, such as an ultrawide band (UWB) protocol or with a wireless ranging technique that has a bandwidth greater than 20 MHz. For example, the communication technique may be used in conjunction with a communication protocol that is compatible with an IEEE 802.11 standard (which is sometimes referred to as Wi-Fi). In some embodiments, the communication technique is used with IEEE 802.11ax, which is used as an illustrative example in the discussion that follows. However, this communication technique may also be used with a wide variety of other communication protocols and/or implementations, and in electronic devices (such as portable electronic devices or mobile devices) that can incorporate multiple different radio access technologies (RATs) to provide connections through different wireless networks that offer different services and/or capabilities.

In particular, an electronic device can include hardware and software to support a wireless personal area network (WPAN) according to a WPAN communication protocol, such as those standardized by the Bluetooth® Special Interest Group (in Kirkland, Wash.) and/or those developed by Apple (in Cupertino, Calif.) that are referred to as an Apple Wireless Direct Link (AWDL). Moreover, the electronic device can communicate via: a wireless wide area network (WWAN), a wireless metro area network (WMAN) a WLAN, near-field communication (NFC), a cellular-telephone or data network (such as using a third generation (3G) communication protocol, a fourth generation (4G) communication protocol, e.g., Long Term Evolution or LTE, LTE Advanced (LTE-A), a fifth generation (5G) communication protocol, or other present or future developed advanced cellular communication protocol) and/or another communication protocol. In some embodiments, the communication protocol includes a peer-to-peer communication technique.

The electronic device, in some embodiments, can also operate as part of a wireless communication system, which can include a set of client devices, which can also be referred to as stations, client electronic devices, or client electronic devices, interconnected to an access point, e.g., as part of a WLAN, and/or to each other, e.g., as part of a WPAN and/or an 'ad hoc' wireless network, such as a Wi-Fi direct connection. In some embodiments, the client device can be any electronic device that is capable of communicating via a WLAN technology, e.g., in accordance with a WLAN communication protocol. Furthermore, in some embodiments, the WLAN technology can include a Wi-Fi (or more generically a WLAN) wireless communication subsystem or radio, and the Wi-Fi radio can implement an IEEE 802.11 technology, such as one or more of: IEEE 802.11a; IEEE 802.11b; IEEE 802.11g; IEEE 802.11-2007; IEEE 802.11n;

IEEE 802.11-2012; IEEE 802.11ac; IEEE 802.11ax, or other present or future developed IEEE 802.11 technologies.

In some embodiments, the electronic device can act as a communications hub that provides access to a WLAN and/or to a WWAN and, thus, to a wide variety of services that can be supported by various applications executing on the electronic device. Thus, the electronic device may include an 'access point' that communicates wirelessly with other electronic devices (such as using Wi-Fi), and that provides access to another network (such as the Internet) via IEEE 802.3 (which is sometimes referred to as 'Ethernet').

Additionally, it should be understood that the electronic devices described herein may be configured as multi-mode wireless communication devices that are also capable of communicating via different 3G and/or second generation (2G) RATs. In these scenarios, a multi-mode electronic device or UE can be configured to prefer attachment to LTE networks offering faster data rate throughput, as compared to other 3G legacy networks offering lower data rate throughputs. For example, in some implementations, a multi-mode electronic device is configured to fall back to a 3G legacy network, e.g., an Evolved High Speed Packet Access (HSPA+) network or a Code Division Multiple Access (CDMA) 2000 Evolution-Data Only (EV-DO) network, when LTE and LTE-A networks are otherwise unavailable.

In accordance with various embodiments described herein, the terms 'wireless communication device,' 'electronic device,' 'mobile device,' 'mobile station,' 'wireless station,' 'wireless access point,' 'station,' 'access point' and 'user equipment' (UE) may be used herein to describe one or more consumer electronic devices that may be capable of performing procedures associated with various embodiments of the disclosure.

We now describe the communication technique. FIG. 1 presents a block diagram illustrating an example of electronic devices communicating wirelessly. One or more electronic devices 110 (such as a smartphone, a laptop computer, a notebook computer, a tablet, a wearable, a media device, a smart hub, or another such electronic device) and access point 112 may communicate wirelessly in a WLAN using an IEEE 802.11 communication protocol. Thus, electronic devices 110 may be associated with access point 112. For example, electronic devices 110 and access point 112 may wirelessly communicate while: detecting one another by scanning wireless channels, transmitting and receiving beacons or beacon frames on wireless channels, establishing connections (for example, by transmitting connect requests), and/or transmitting and receiving packets or frames (which may include the request and/or additional information, such as data, as payloads). Note that access point 112 may provide access to a network, such as the Internet, via an Ethernet protocol, and may be a physical access point or a virtual (or 'software') access point that is implemented on a computer or an electronic device.

As described further below with reference to FIG. 8, electronic devices 110 and access point 112 may include subsystems, such as a networking subsystem, a memory subsystem, and a processor subsystem. In addition, electronic devices 110 and access point 112 may include radios 114 in the networking subsystems. More generally, electronic devices 110 and access point 112 can include (or can be included within) any electronic devices with networking subsystems that enable electronic devices 110 and access point 112 to wirelessly communicate with another electronic device. This can include transmitting beacons on wireless channels to enable the electronic devices to make initial contact with or to detect each other, followed by exchanging subsequent data/management frames (such as connect requests) to establish a connection, configure security options (e.g., IPSec), transmit and receive packets or frames via the connection, etc.

As can be seen in FIG. 1, wireless signals 116 (represented by a jagged line) are communicated by radios 114-1 and 114-2 in electronic device 110-1 and access point 112, respectively. For example, as noted previously, electronic device 110-1 and access point 112 may exchange packets using a Wi-Fi communication protocol in a WLAN. As illustrated further below with reference to FIGS. 2 and 3, radio 114-1 may receive samples of wireless signals 116 in a time interval, where wireless signals 116 are transmitted by radio 114-2. Based at least in part on the samples and a predefined or predetermined number of paths in a channel in a wireless environment of electronic device 110-1, radio 114-1 may generate a signal spectrum corresponding to a set of estimated wireless-communication parameters, such as times of arrival of wireless signals 116, angles of arrival of wireless signals 116, and/or amplitudes of wireless signals 116. For example, as described further below, the signal spectrum may be computed based at least in part on an eigenvalue decomposition of a moving-average covariance matrix of channel estimates that are based at least in part on the samples. In some embodiments, the signal spectrum is based at least in part on MUSIC analysis of the eigenvectors determined in the eigenvalue decomposition. Note that the samples may include single instances of one or more multipath signals associated with the number of paths, so that the covariance matrix is underdetermined. Consequently, the covariance matrix may be estimated or approximated.

Then, radio 114-1 may select a lower (such as a minimum) wireless-communication parameter in the set of wireless-communication parameters that has an associated regression model with a fit to the signal spectrum that exceeds a statistical confidence threshold, such as a p-value less than $10^{-4}$ or $10^{-5}$. More generally, the p-value may be larger or smaller than these values, such as $10^{-1}$, $10^{-2}$, $10^{-3}$, $10^{-6}$, $10^{-7}$, $10^{-10}$, etc. Note that, in at least some implementations, the wireless-communication parameter may be selected from the set of wireless-communication parameters based at least in part on hypothesis testing.

Next, radio 114-1 may identify, based at least in part on the selected lower wireless-communication parameter, samples of the wireless signal in the wireless signals associated with the line of sight between electronic device 110-1 and access point 112. Radio 114-1 may also determine its distance from another electronic device, such as access point 112. For example, a phone can determine its distance from a computer to facilitate unlocking. Therefore, in some embodiments, radio 114-1 determines a distance 118 between electronic device 110-1 and, e.g., access point 112 based at least in part on the identified samples.

In these ways, the communication technique may allow electronic devices 110 and access point 112 to identify wireless signals associated with line-of-sight communication and to accurately determine distance, such as an accuracy of ones, tens, or hundreds of centimeters. These capabilities may improve the user experience when using electronic devices 110. For example, the accurately determined distance may facilitate location-based services and/or other device functions.

Note that access point 112 and at least some of electronic devices 110 may be compatible with an IEEE 802.11 standard that includes trigger-based channel access (such as IEEE 802.11ax). However, access point 112 and at least this subset of electronic devices 110 may also communicate with one or more legacy electronic devices that are not compatible with the IEEE 802.11 standard (i.e., that do not use multi-user trigger-based channel access). In some embodiments, at least a subset of electronic devices 110 use multi-user transmission (such as orthogonal frequency division multiple access or OFDMA).

In the described embodiments, processing a packet or frame in one of electronic devices 110 and access point 112 includes: receiving wireless signals 116 encoding a packet or a frame; decoding/extracting the packet or frame from received wireless signals 116 to acquire the packet or frame; and processing the packet or frame to determine information contained in the packet or frame (such as data in the payload).

In general, the communication via the WLAN in the communication technique may be characterized by a variety of communication-performance metrics. For example, the communication-performance metric may include: a received signal strength (RSS), a data rate, a data rate for successful communication (which is sometimes referred to as a 'throughput'), a latency, an error rate (such as a retry or resend rate), a mean-square error of equalized signals relative to an equalization target, inter-symbol interference, multipath interference, a signal-to-noise ratio (SNR), a width of an eye pattern, a ratio of number of bytes successfully communicated during a time interval (such as 1-10 s) to an estimated maximum number of bytes that can be communicated in the time interval (the latter of which is sometimes referred to as the 'capacity' of a communication channel or link), and/or a ratio of an actual data rate to an estimated data rate (which is sometimes referred to as 'utilization').

Although we describe the network environment shown in FIG. 1 as an example, in alternative embodiments, different numbers and/or types of electronic devices may be present. For example, some embodiments may include more or fewer electronic devices. As another example, in other embodiments, different electronic devices can be transmitting and/or receiving packets or frames.

Figure 2:
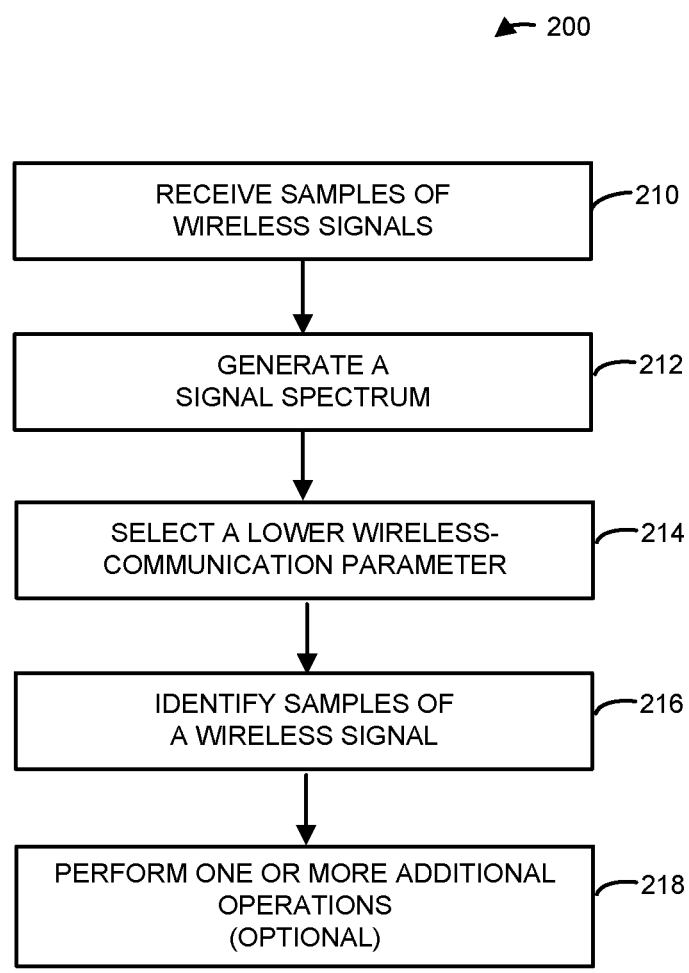
FIG. 2 is a flow diagram illustrating an example method for identifying wireless signals associated with a line of sight between an electronic device and a second electronic device using an electronic device in FIG. 1.

FIG. 2 presents a flow diagram illustrating an example method 200 for identifying wireless signals associated with a line of sight between an electronic device and a second electronic device. This method may be performed by an electronic device, such as an interface circuit in electronic device 110-1 in FIG. 1. During operation, the interface circuit may receive samples of wireless signals (operation 210) in a time interval, where the wireless signals are associated with the second electronic device.

Then, the interface circuit may generate, based at least in part on the samples and a number of paths in a channel in a wireless environment of the electronic device, a signal spectrum (operation 212) corresponding to a set of estimated wireless-communication parameters, such as times of arrival of the wireless signals, angles of arrival of the wireless signals, and/or amplitudes of the wireless signals. For example, the signal spectrum may be computed based at least in part on an eigenvalue decomposition of a moving-average covariance matrix of channel estimates that are based at least in part on the samples. Note that the moving average may be computed forward and backward in time. In some embodiments, the signal spectrum is based at least in part on MUSIC analysis of the eigenvectors determined in the eigenvalue decomposition. As noted previously, the samples may include single instances of one or more multipath signals associated with the number of paths, so that the covariance matrix is underdetermined. Consequently, the covariance matrix may be estimated or approximated.

Moreover, the interface circuit may select a lower wireless-communication parameter (operation 214) in the set of wireless-communication parameters that has an associated regression model with a fit to the signal spectrum that exceeds a statistical confidence threshold. Note that the wireless-communication parameter may be selected from the set of wireless-communication parameters based at least in part on hypothesis testing.

Next, the interface circuit may identify, based at least in part on the selected lower wireless-communication parameter, samples of the wireless signal (operation 216) in the wireless signals associated with the line of sight between the electronic device and the second electronic device.

In some embodiments, the interface circuit optionally performs one or more additional operations (operation 218). For example, the interface circuit may determine a distance between the electronic device and the second electronic device based at least in part on the identified samples.

In some embodiments of method 200, there may be additional or fewer operations. Moreover, the order of the operations may be changed, and/or two or more operations may be combined into a single operation.

In some embodiments, at least some of the operations in method 200 is performed by an interface circuit in the electronic device. For example, at least some of the operations may be performed by firmware executed by an interface circuit, such as firmware associated with a MAC layer, as well as one or more circuits in a physical layer in the interface circuit.

Figure 3:
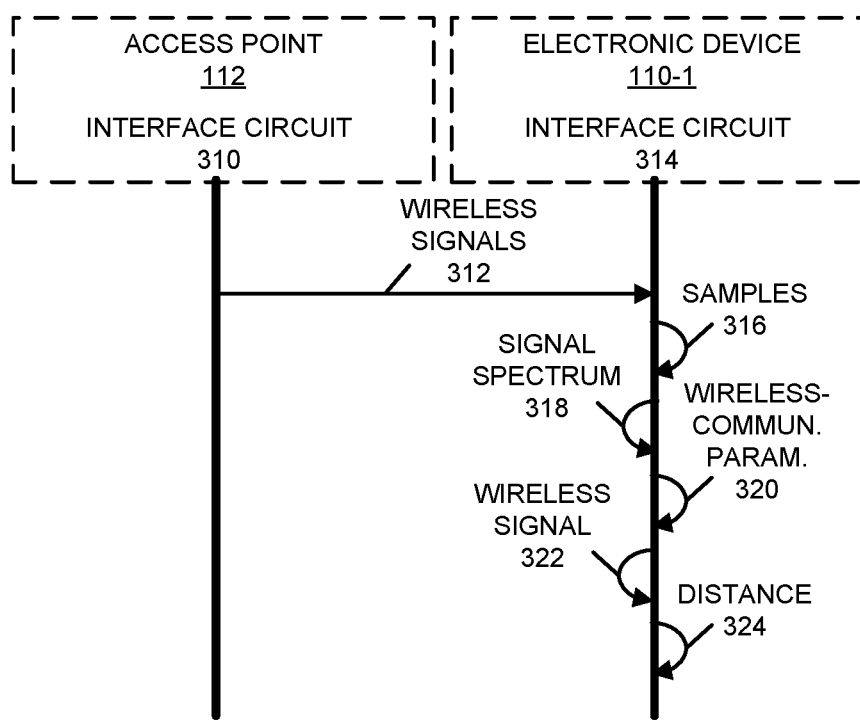
FIG. 3 is a flow diagram illustrating an example of communication between electronic devices, such as the electronic devices of FIG. 1.

The communication technique is further illustrated in FIG. 3, which presents a flow diagram illustrating an example of communication between electronic device 110-1 and access point 112. In particular, interface circuit 310 in access point 112 may transmit wireless signals 312 to electronic device 110-1. Then, interface circuit 314 in electronic device 110-1 may receive samples 316 of wireless signals 312 in a time interval.

Then, interface circuit 314 may generate, based at least in part on the samples and a number of paths in a channel in a wireless environment of electronic device 110-1, a signal spectrum 318 corresponding to a set of estimated wireless-communication parameters. For example, signal spectrum 318 may be computed based at least in part on an eigenvalue decomposition of a moving-average covariance matrix of channel estimates that are based at least in part on the samples. Moreover, signal spectrum 318 may be based at least in part on MUSIC analysis of the eigenvectors determined in the eigenvalue decomposition.

Moreover, interface circuit 314 may select a lower wireless-communication parameter 320 in the set of wireless-communication parameters that has an associated regression model with a fit to signal spectrum 316 that exceeds a statistical confidence threshold.

Next, interface circuit 314 may identify, based at least in part on the selected wireless-communication parameter 320, samples 322 of a wireless signal in the wireless signals associated with the line of sight between electronic device 110-1 and access point 112.

In some embodiments, interface circuit 314 can optionally determine a distance 324 between electronic device 110-1 and access point 112 based at least in part on the identified samples 322.

Representative Embodiments

We now describe embodiments of the communication technique. This communication technique may perform false-peak mitigation for MUSIC-based time-of-arrival estimation using hypothesis testing with linear regression. Moreover, the communication technique may improve the accuracy of distance determination using ultrawide-band communication.

Figure 4:
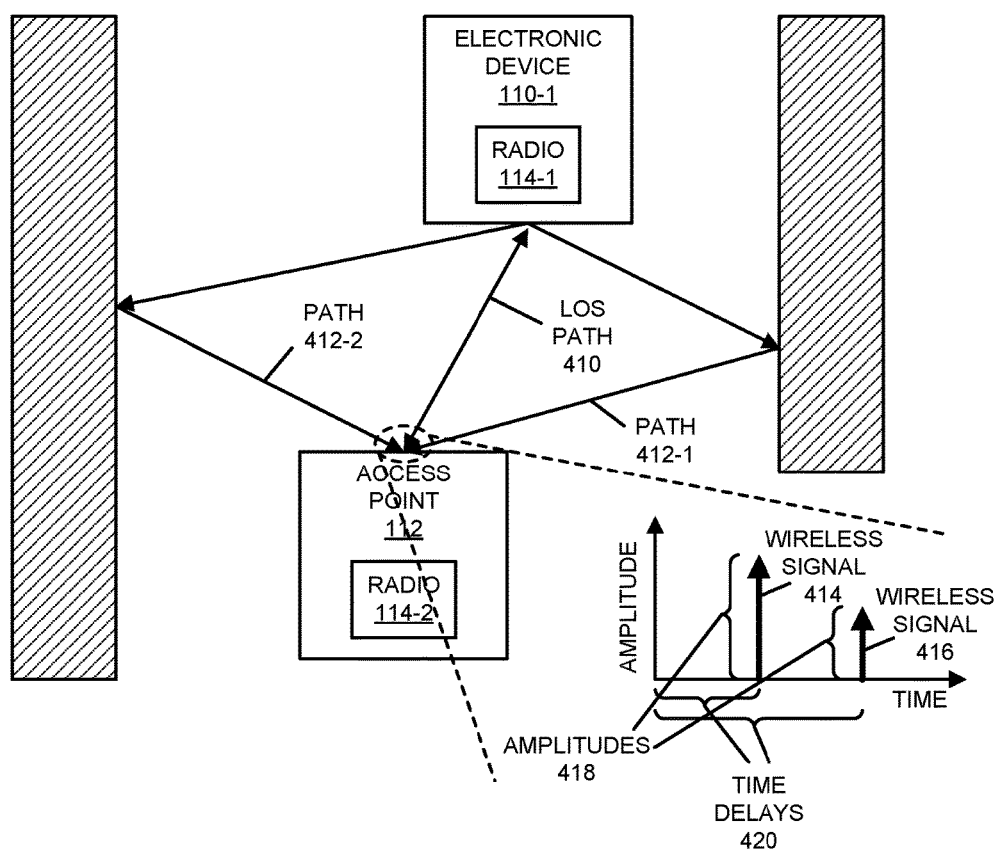
FIG. 4 is a drawing illustrating example communication between electronic devices, such as the electronic devices of FIG. 1.

FIG. 4 presents a drawing illustrating a communication between electronic devices, such as electronic device 110-1 and access point 112 in FIG. 1. In FIG. 4, there are multiple paths between electronic device 110-1 and access point 112, including a line-of-sight (LOS) path 410 that results in a direct wireless signal 414, and additional paths 412 that give rise to multi-path wireless signals (such as wireless signal 416). As shown in the inset, which illustrates the received wireless signals at electronic device 110-1, wireless signals 414 and 416 have associated amplitudes 418 and time delays 420. However, it can be difficult to distinguish or separate wireless signal 414 from wireless signals 416.

Figure 5:
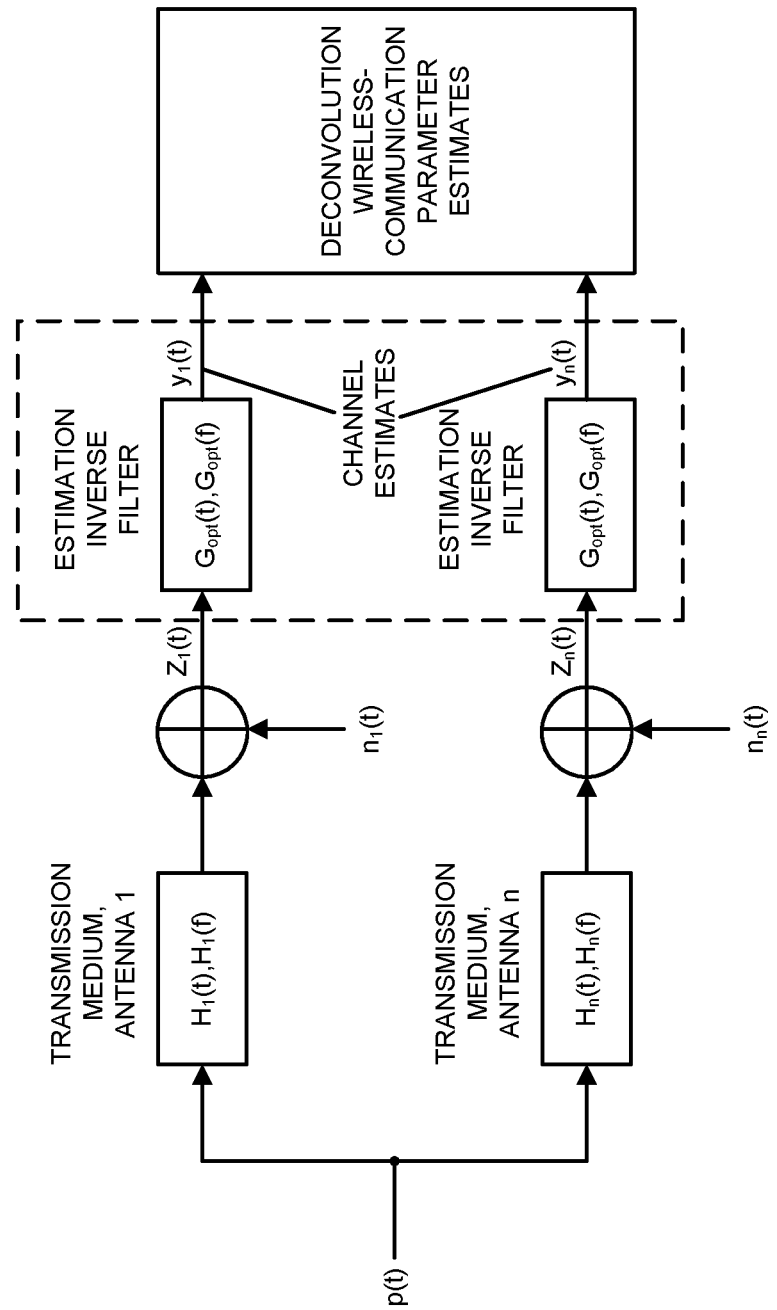
FIG. 5 is a drawing illustrating example communication between electronic devices, such as the electronic devices of FIG. 1.

FIG. 5 presents a drawing illustrating a communication between electronic devices, such as electronic device 110-1 and access point 112 in FIG. 1. In FIG. 5, a modulating waveform p(t) is transmitted by N antennas in a transmitting electronic device through paths having channel impulse responses $h_i(t)$ in the time domain (where i is an integer between 1 and N) and $H_i(f)$ in the frequency domain. In addition, additive noise $n_i(t)$ corrupts the transmitted wireless signals.

Samples, $z_i(t)$, of the wireless signals are received by N antennas or sensors in a receiving electronic device. These samples are passed through a set of estimation inverse filters having impulse responses $g_{opt}(t)$ or, equivalently, $G_{opt}(f)$. Then, the resulting channel estimates (which, in principle, include multiple direct and multipath signals) are deconvolved to determine time-of-arrival (TOA) and distance-of-arrival (DOA) estimates. Note that the estimation inverse filters provide minimum mean square error (MMSE)-type estimates of a segment of the aggregate impulse response. In general, for a high SNR of, e.g., 30 dB, inverse filters may be used, while for a low SNR of, e.g., 15 dB, a matched filter may be used. Moreover, as described further below, the deconvolution may employ a high-resolution deconvolution technique to solve for individual path delays, so that the first or lower path delay can be selected.

Thus, given the received wireless signals as a function of time and space (in electronic devices with spatial diversity, e.g., multiple antennas), wireless-communication parameters associated with a first or line-of-sight path may be estimated, such as one or more of: the loss of signal, the time of flight, the direction of arrival (DOA), etc.

Because the channel transfer function may be unknown, $G_{opt}(f)$ may be the inverse of the pulse shape or the modulating waveform in the frequency domain, P(f), i.e., $$G_{opt}(f) = \frac{1}{P(f)}.$$

Moreover, the superposition of time domain delays associated with different paths results in a summation of exponentials in the frequency domain. For well-separated frequencies, a Fourier technique (such as an FFT or a DFT) allows the wireless signals associated with different paths to be estimated. However, as noted previously, when the tone separation is closely spaced (e.g., when the tone separation is close to Fourier resolution), a high-resolution technique may be used, such as one based at least in part on the covariance matrix (e.g., MUSIC, maximum likelihood, etc.).

Let the number of instances or snapshots (i.e., independent data) be Q, the number of paths be M, and the FFT size be N. Then the channel model can be expressed as $$y_n(q) = x_n(q) + v_n(q)$$

where $$n = -\frac{N-1}{2}, \ldots, \frac{N-1}{2},$$

$$x_n(q) = \sum_{m=1}^{M} g_m(q) \cdot e^{jn\omega_m},$$

$$w_m = \frac{2\pi \tau_m F_s}{N},$$

M is less than N, and n is a frequency-domain index. Note that q (which is sometimes indicated as θ) indicates a wireless-communication parameter, such as the delay.

Alternatively, in the frequency domain, the model can be expressed as $$Y(q) = X(q) + V(q)$$

or $$Y(q) = S \cdot H(q) + V(q)$$

where $$S = [S_1, S_2, \ldots, S_M].$$

Furthermore, $$S_m = z_m^{-(N-1)/2} [1, z_m, \ldots, z_m^{N-1}]^T,$$

where $z_m = \exp(j\omega_m)$, and $$H(q) = [H_1(q), H_2(q), \ldots, H_M(q)]^T.$$

As noted previously, eigenvalue decomposition can be used for frequency estimation. The data covariance matrix is given by $$R_Y = \frac{1}{Q} \sum_{q=1}^{Q} Y(q) Y(q)^H = SPS^H$$

and the signal covariance matrix is given by $$P = \frac{1}{Q} \sum_{q=1}^{Q} G(q) G(q)^H.$$

During eigenvalue decomposition, the signal subspace may be estimated in a first operation. Then, in a second operation, the frequencies may be estimated from the estimated signal subspace (and the noise subspace). Estimating the signal may rely on the hypothesis that the signal manifold {X(q)} spans the whole signal subspace. In this case, Rx has M nonzero signal eigenvalues.

If the condition on {X(q)} is not specified, the rank of Rx is less than M (the minimal requirement) and some additional information has to be used in order to estimate the covariance matrix, such as a moving average or smoothing. Note that this is true when Q is less than M (e.g., when Q equals one).

Estimating the frequencies may rely on the orthogonality, to all the signal vectors, of any vector E in the noise subspace, i.e., ∀E ∈ noise subspace, $S_m^H E=0$. Thus, the frequencies may be estimated based at least in part on the intersection of the array manifold or projection. For example, as discussed further below, the inverse of the intersection of the array manifold or projection may include a series of peaks. Equivalently, a discriminating function can be defined as $$f_E(\omega) = S(z)^H E,$$

where $z = \exp(j\omega)$.

During the first preprocessing operation, a moving average (such as a forward-moving average) may be computed. For example, when the number of instances or snapshots Q is less than M, then the signal manifold given by $\{X(q)\}$ may no longer span the signal subspace. In order to extend the rank of the signal manifold to M, the shift invariant property of the complex exponentials may be used. Consider sub-vectors of length L, formed from a large vector (of length N). The number of such sub-vectors is K, which equals N−L+1. These sub-vectors are L adjacent and centered at index k, i.e., $$Y_k(q) = (y_{k-(L-1/2)}(q), y_k(q), y_{k+1}(q), \ldots, (q))^T.$$

Alternatively, the sub-vectors equal $X_k(q) + V_k(q)$. Note that the range of k is $$-\frac{K-1}{2} \le k \le \frac{K-1}{2},$$

where K equals N−L+1.

The number of vectors in the subset $\{X(q)\}$ is now K·Q. Decorrelation of the channel gains can be achieved by computing a new, moving-averaged covariance matrix $$R_Y^B = \frac{1}{K \cdot Q} \sum_{q=1}^{Q} \sum_{k=-(K-1/2)}^{K-1/2} Y_k(q) Y_k(q)^H.$$

Similarly, in some embodiments this approach may be enhanced by using a forward-backward moving average (smoothing) when Q is less than M. From $$S_m = z_m^{-(N-1)/2}[1, z_m, \ldots, z_m^{N-1}]^T,$$

it can be seen that the signals vectors are Hermitian symmetric. That is, if the components of $S_m$ are order-reversed and conjugated, then $S_m$ remains invariant. This operation can be applied to the sub-vector responses $X_k(q)$ to obtain the reversed-conjugated sub-vector $\hat{X}_k(q)$. Moreover, the final estimate of the covariance matrix, combining the forward and backward operations can be expressed as $$\hat{R}_Y^{FB} = \frac{1}{K \cdot Q} \sum_{q=1}^{Q} \sum_{k=-(K-1/2)}^{K-1/2} \left( Y_k(q) Y_k(q)^H + \hat{Y}_k(q) \hat{Y}_k(q)^H \right).$$

Eigenvalue decomposition may be applied to this estimated covariance matrix. First, the signal and the noise subspace may be estimated. Then, a 'spectral representation' of the signal may be obtained by plotting $f_E(\omega)^{-2}$. This spectral representation is sometimes referred to as MUSIC. Thus, $R_Y$ is used to determine $R_Y^B$, which is then used to determine $\hat{R}_Y^{FB}$.

Figure 6:
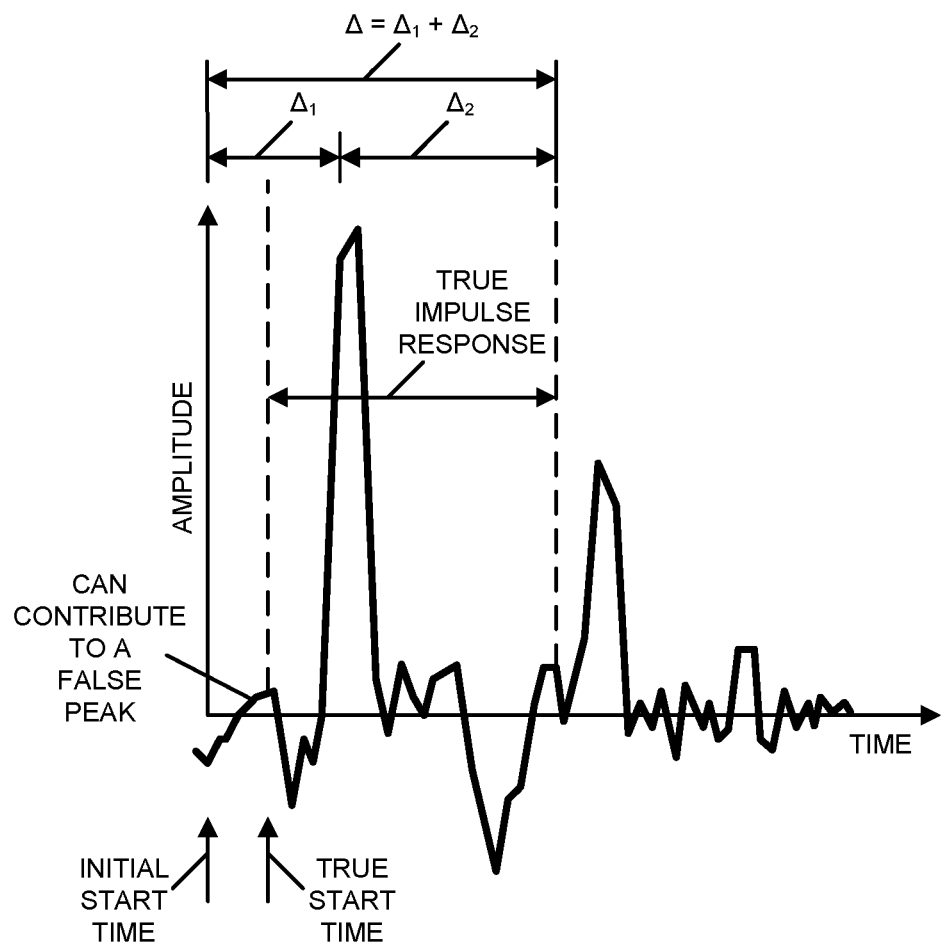
FIG. 6 is a drawing illustrating example wireless signals during communication between electronic devices, such as the electronic devices of FIG. 1.

As shown in FIG. 6, which presents a drawing illustrating wireless signals during communication between electronic devices 110 in FIG. 1, the processing window includes the composite channel impulse response and false peaks. The wireless-communication parameter(s) (such as the time of arrival or the direction of arrival) may be estimated using a window or time interval of data of length Δ. For example, the time interval may be 25 ns. More generally, the time interval is less than 100 ns. Note that the data may have been averaged and may de-spread (in the presence of a spreading code).

In FIG. 6, Δ equals $\Delta_1$ plus $\Delta_2$. $\Delta_1$ is the time interval between an initial guess at the start time and the true (initially unknown) start time. For example, $\Delta_1$ may be 4 ns. This means that the initial start time may be approximately four samples before the true start time. Note that peaks during $\Delta_1$ can contribute to a false peak during the MUSIC analysis. In general, as Ai increases, the number of false peaks increased. Moreover, $\Delta_2$ is a time interval that determines the length of the true impulse response.

Figure 7:
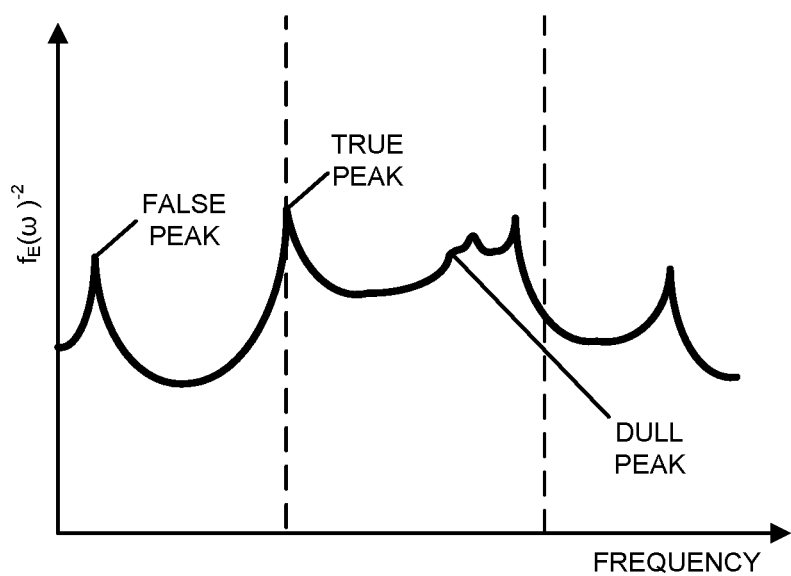
FIG. 7 is a drawing illustrating an example of identification of wireless signals associated with a line of sight between an electronic device and a second electronic device, such as the electronic devices of FIG. 1.

FIG. 7 presents a drawing illustrating identification of wireless signals associated with a line of sight between an electronic device and a second electronic device, such as the electronic devices of FIG. 1. FIG. 7 illustrates $f_E(\omega)^{-2}$. Note that, in addition, to true peaks, there can be false peaks and dull peaks. A dull peak can be missed if there is not a significant drop or decrease proximate to the peak. Moreover, a false peak can be incorrectly selected as being associated with the line-of-sight wireless signal, which can result in errors in the determination of the wireless-communication parameter (such as the time of arrival). Consequently, false peaks can significantly degrade the communication performance.

In order to address this challenge, linear regression with multiple predictors and an F-statistic may be used. For example, $y_n$ may be regressed on the variables $\beta_0, \beta_1, \ldots \beta_P$, where P is the number of multi-paths detected using the MUSIC analysis, and the predictor variables were also identified using the MUSIC analysis. Note that the predictor variables $s_i$ are derived from $z = \exp(j\omega)$. After linear regression, $$\hat{y}_n = \beta_0 + \beta_1 s_1 + \beta_2 s_2 + \ldots + \beta_P s_P,$$

where n equals 1 to N.

Define a residual sum of squares $$RSS = \sum_{n=1}^{N} (y_n - \hat{y}_n)^2.$$

Moreover, define $$RSS(p) = \sum_{n=1}^{N} (y_n - \hat{y}_n^p)^2,$$

where $\hat{y}_n^p$ is the prediction value when $y_n$ is regressed on the variables $\beta_k$, except that $p \in [1\ P]$. Then, an F-statistic can be defined as $$F(p) = \frac{RSS(p) - RSS}{\frac{RSS}{(n-p-1)}}.$$

This F-statistic can be used to perform hypothesis testing (i.e., $H_0$: $\beta_p$ equals zero) to avoid overfitting. Note that the F-test provides information about whether each individual predictor is related to the response. It reports the partial effect of adding that variable to the regression model.

An equivalent formulation for the linear regression with multiple predictors may use the t-statistic and the p-value. Hypothesis tests may be performed on each of the coefficients $\beta_p$. The null hypothesis is that there is no relationship between Y and $S_p$ (i.e., $H_0$: $\beta_p$ equals zero). Alternatively, there may be a relationship between Y and $S_p$ (i.e., $H_1$: $\beta_p$ is not equal to zero). In order to define a statistical test, two parameters are needed: the estimate $\hat{\beta}_p$ after performing the multiple regression test (where $$\hat{\beta}_p = \frac{\langle z_p, y \rangle}{\langle z_p, z_p \rangle}$$

and the standard deviation of each of the variables, i.e., $$SE(\hat{\beta}_p) = (S^H S)^{-1}_{pp} = \frac{\sigma^2}{\|z_p\|^2}.$$

If $\hat{\beta}_p$ is far enough from zero, then it can be inferred that hypothesis $H_1$ is true. But how far is sufficient depends on the $SE(\hat{\beta}_p)$. If the standard deviation is very small, then even a small $\hat{\beta}_p$ can provide evidence that $\hat{\beta}_p$ is not equal to zero. However, if $SE(\hat{\beta}_p)$ is large, then a large absolute value of $\hat{\beta}_p$ is needed to reject the null hypothesis. For this purpose, the t-statistic $$t = \frac{\hat{\beta}_p}{SE(\hat{\beta}_p)}$$

may be computed. The t-statistic measures the number of standard deviations that $\hat{\beta}_p$ is away from zero. Note that the $p^{th}$ multiple regression coefficient is the univariate regression of y on the variable $Z_p$, which is the residual after regressing $S_p$ on all the other variables.

If indeed there is no relationship between Y and Sp, then the t-statistic will have a t-distribution. Moreover, if N is large enough, the distribution will approach Gaussian. Furthermore, if the absolute value of is large, it is unlikely that the hypothesis $H_0$ is correct.

Assuming that the null hypothesis is correct, the probability $$Pr\left(t' \geq \left|\frac{\hat{\beta}_p}{SE(\hat{\beta}_p)}\right|\right)$$

can be computed. This probability is called the p-value. A very small p-value indicates that it is unlikely to observe such a large t-statistic due to chance, given the absence of any real association between the predictor and the response. Consequently, a small p-value may indicate that the null hypothesis is rejected. Note that there is a relationship between the t-statistic and the F-statistic. For example, the square of each t-statistic may be the corresponding F-statistic.

In summary, during the communication technique the wireless-communication parameter (such as the time of arrival) may be estimated while mitigating the false peaks by: performing forward and backward averaging to estimate the covariance matrix; performing eigenvalue decomposition and computing the signal spectrum; identifying peaks using the MUSIC analysis; performing least squares fits or regression with all the above predictors and computing t-statistics and p-values for each predictor; using a training set of data (e.g., 200 channels) and classifying the first peak as valid versus false given the p-value and the t-statistic of the first regression coefficient; and given this training model, using test data to identify false peaks given the t-statistics and the p-values.

In a simulation with an SNR of −15 dB, 2000 channels, Δ of 25 ns, a bandwidth of 375 MHz and 256-bit FFT, the communication technique may be used to estimate distance. For example, after identifying the lower time of arrival and, thus, the associated line-of-sight wireless signal, the distance can be determined with an accuracy of: 3.9 cm 68% of the time, 10.2 cm 11% of the time, 20 cm 4.9% of the time, and 100.3 cm 0.6% of the time.

In some embodiments, instead of dividing the channel estimates by P(f), the sounding waveform may be used as part of the regression fit, i.e., $$\left| Y(f) - P(f) \cdot \sum_{m=1}^{M} g_m e^{-j2\pi \tau_m f} \right|^2.$$

In a simulation with an SNR of −15 dB, 2000 channels, Δ of 25 ns, a bandwidth of 375 MHz and 256-bit FFT, the communication technique may be used to estimate distance. For example, after identifying the lower time of arrival and, thus, the associated line-of-sight wireless signal, the distance can be determined with an accuracy of: 17.1 cm 4.9% of the time, and 99.4 cm 0.3% of the time.

In the preceding discussion of the communication technique, M is known or predetermined. Note that by allowing the number of snapshots or instances Q to be less than M, the communication technique may provide fast convergence. In addition, the communication technique may be used in dynamic wireless environments, where the wireless-communication parameters (such as the time delays and the amplitudes) are time variant, which may prevent the use of multiple snapshots or instances of the measured wireless samples.

We now describe embodiments of an electronic device. FIG. 8 presents a block diagram of an electronic device 800 (which may be a cellular telephone, an access point, another electronic device, etc.) in accordance with some embodiments. This electronic device includes processing subsystem 810, memory subsystem 812, and networking subsystem 814. Processing subsystem 810 includes one or more devices configured to perform computational operations. For example, processing subsystem 810 can include one or more microprocessors, application-specific integrated circuits (ASICs), microcontrollers, programmable-logic devices, and/or one or more digital signal processors (DSPs).

Memory subsystem 812 includes one or more devices for storing data and/or instructions for processing subsystem 810 and networking subsystem 814. For example, memory subsystem 812 can include dynamic random access memory (DRAM), static random access memory (SRAM), a read-only memory (ROM), flash memory, and/or other types of memory. In some embodiments, instructions for processing subsystem 810 in memory subsystem 812 include: one or more program modules or sets of instructions (such as program module 822 or operating system 824), which may be executed by processing subsystem 810. For example, a ROM can store programs, utilities or processes to be executed in a non-volatile manner, and DRAM can provide volatile data storage, and may store instructions related to the operation of electronic device 800. Note that the one or more computer programs may constitute a computer-program mechanism, a computer-readable storage medium or software. Moreover, instructions in the various modules in memory subsystem 812 may be implemented in: a high-level procedural language, an object-oriented programming language, and/or in an assembly or machine language. Furthermore, the programming language may be compiled or interpreted, e.g., configurable or configured (which may be used interchangeably in this discussion), to be executed by processing subsystem 810. In some embodiments, the one or more computer programs are distributed over a network-coupled computer system so that the one or more computer programs are stored and executed in a distributed manner.

In addition, memory subsystem 812 can include mechanisms for controlling access to the memory. In some embodiments, memory subsystem 812 includes a memory hierarchy that comprises one or more caches coupled to a memory in electronic device 800. In some of these embodiments, one or more of the caches is located in processing subsystem 810.

In some embodiments, memory subsystem 812 is coupled to one or more high-capacity mass-storage devices (not shown). For example, memory subsystem 812 can be coupled to a magnetic or optical drive, a solid-state drive, or another type of mass-storage device. In these embodiments, memory subsystem 812 can be used by electronic device 800 as fast-access storage for often-used data, while the mass-storage device is used to store less frequently used data.

Figure 8:
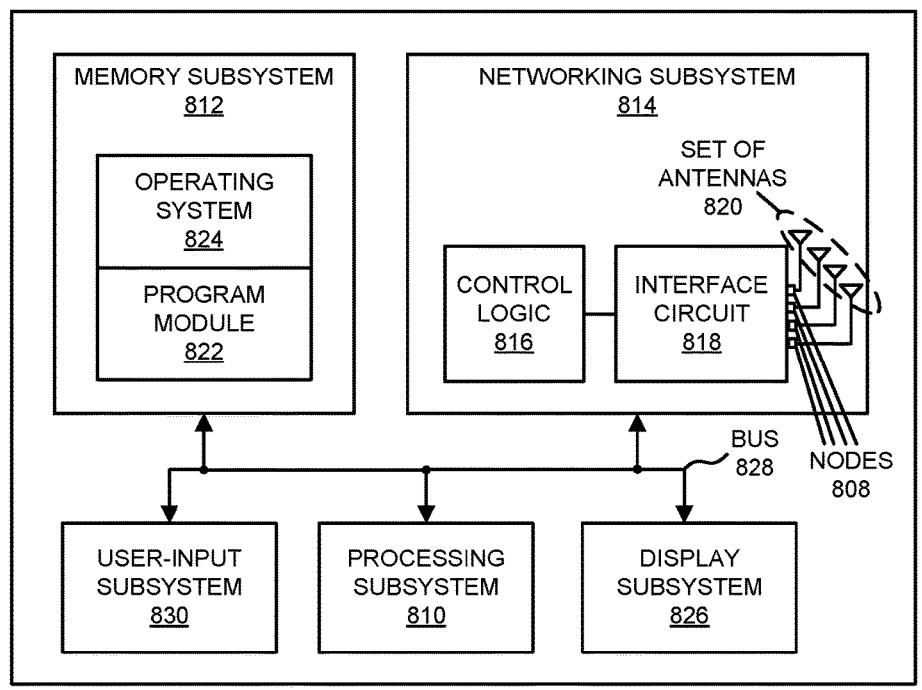
FIG. 8 is a block diagram illustrating an example of one of the electronic devices of FIG. 1.

Networking subsystem 814 includes one or more devices configured to couple to and communicate on a wired and/or wireless network (i.e., to perform network operations), including: control logic 816, an interface circuit 818 and a set of antennas 820 (or antenna elements) in an adaptive array that can be selectively turned on and/or off by control logic 816 to create a variety of optional antenna patterns or 'beam patterns.' (While FIG. 8 includes set of antennas 820, in some embodiments electronic device 800 includes one or more nodes, such as nodes 808, e.g., a pad, which can be coupled to set of antennas 820. Thus, electronic device 800 may or may not include set of antennas 820.) For example, networking subsystem 814 can include a Bluetooth™ networking system, a cellular networking system (e.g., a 3G/4G/5G network such as UMTS, LTE, etc.), a universal serial bus (USB) networking system, a networking system based on the standards described in IEEE 802.11 (e.g., a Wi-Fi® networking system), an Ethernet networking system, and/or another networking system.

Networking subsystem 814 includes processors, controllers, radios/antennas, sockets/plugs, and/or other devices used for coupling to, communicating on, and handling data and events for each supported networking system. Note that mechanisms used for coupling to, communicating on, and handling data and events on the network for each network system are sometimes collectively referred to as a 'network interface' for the network system. Moreover, in some embodiments a 'network' or a 'connection' between the electronic devices does not yet exist. Therefore, electronic device 800 may use the mechanisms in networking subsystem 814 for performing simple wireless communication between the electronic devices, e.g., transmitting advertising or beacon frames and/or scanning for advertising frames transmitted by other electronic devices.

Within electronic device 800, processing subsystem 810, memory subsystem 812, and networking subsystem 814 are coupled together using bus 828 that facilitates data transfer between these components. Bus 828 may include an electrical, optical, and/or electro-optical connection that the subsystems can use to communicate commands and data among one another. Although only one bus 828 is shown for clarity, different embodiments can include a different number or configuration of electrical, optical, and/or electro-optical connections among the subsystems.

In some embodiments, electronic device 800 includes a display subsystem 826 for displaying information on a display, which may include a display driver and the display, such as a liquid-crystal display, a multi-touch touchscreen, etc. Display subsystem 826 may be controlled by processing subsystem 810 to display information to a user (e.g., information relating to incoming, outgoing, or an active communication session).

Electronic device 800 can also include a user-input subsystem 830 that allows a user of the electronic device 800 to interact with electronic device 800. For example, user-input subsystem 830 can take a variety of forms, such as: a button, keypad, dial, touch screen, audio input interface, visual/image capture input interface, input in the form of sensor data, etc.

Electronic device 800 can be (or can be included in) any electronic device with at least one network interface. For example, electronic device 800 may include: a cellular telephone or a smartphone, a tablet computer, a laptop computer, a notebook computer, a personal or desktop computer, a netbook computer, a media player device, an electronic book device, a MiFi® device, a smartwatch, a wearable computing device, a portable computing device, a consumer-electronic device, an access point, a router, a switch, communication equipment, test equipment, as well as any other type of electronic computing device having wireless communication capability that can include communication via one or more wireless communication protocols.

Although specific components are used to describe electronic device 800, in alternative embodiments, different components and/or subsystems may be present in electronic device 800. For example, electronic device 800 may include one or more additional processing subsystems, memory subsystems, networking subsystems, and/or display subsystems. Additionally, one or more of the subsystems may not be present in electronic device 800. Moreover, in some embodiments, electronic device 800 may include one or more additional subsystems that are not shown in FIG. 8. Also, although separate subsystems are shown in FIG. 8, in some embodiments some or all of a given subsystem or component can be integrated into one or more of the other subsystems or component(s) in electronic device 800. For example, in some embodiments program module 822 is included in operating system 824 and/or control logic 816 is included in interface circuit 818.

Moreover, the circuits and components in electronic device 800 may be implemented using any combination of analog and/or digital circuitry, including: bipolar, PMOS and/or NMOS gates or transistors. Furthermore, signals in these embodiments may include digital signals that have approximately discrete values and/or analog signals that have continuous values. Additionally, components and circuits may be single-ended or differential, and power supplies may be unipolar or bipolar.

An integrated circuit (which is sometimes referred to as a 'communication circuit') may implement some or all of the functionality of networking subsystem 814. This integrated circuit may include hardware and/or software mechanisms that are used for transmitting wireless signals from electronic device 800 and receiving signals at electronic device 800 from other electronic devices. Aside from the mechanisms herein described, radios are generally known in the art and hence are not described in detail. In general, networking subsystem 814 and/or the integrated circuit can include any number of radios. Note that the radios in multiple-radio embodiments function in a similar way to the described single-radio embodiments.

In some embodiments, networking subsystem 814 and/or the integrated circuit include a configuration mechanism (such as one or more hardware and/or software mechanisms) that configures the radio(s) to transmit and/or receive on a given communication channel (e.g., a given carrier frequency). For example, in some embodiments, the configuration mechanism can be used to switch the radio from monitoring and/or transmitting on a given communication channel to monitoring and/or transmitting on a different communication channel. (Note that 'monitoring' as used herein comprises receiving signals from other electronic devices and possibly performing one or more processing operations on the received signals)

In some embodiments, an output of a process for designing the integrated circuit, or a portion of the integrated circuit, which includes one or more of the circuits described herein may be a computer-readable medium such as, for example, a magnetic tape or an optical or magnetic disk. The computer-readable medium may be encoded with data structures or other information describing circuitry that may be physically instantiated as the integrated circuit or the portion of the integrated circuit. Although various formats may be used for such encoding, these data structures are commonly written in: Caltech Intermediate Format (CIF), Calma GDS II Stream Format (GDSII) or Electronic Design Interchange Format (EDIF). Those of skill in the art of integrated circuit design can develop such data structures from schematic diagrams of the type detailed above and the corresponding descriptions and encode the data structures on the computer-readable medium. Those of skill in the art of integrated circuit fabrication can use such encoded data to fabricate integrated circuits that include one or more of the circuits described herein.

While the preceding discussion used a Wi-Fi communication protocol as an illustrative example, in other embodiments a wide variety of communication protocols and, more generally, wireless communication techniques may be used. Thus, the communication technique may be used in a variety of network interfaces. Furthermore, while some of the operations in the preceding embodiments were implemented in hardware or software, in general the operations in the preceding embodiments can be implemented in a wide variety of configurations and architectures. Therefore, some or all of the operations in the preceding embodiments may be performed in hardware, in software or both. For example, at least some of the operations in the communication technique may be implemented using program module 822, operating system 824 (such as a driver for interface circuit 818) or in firmware in interface circuit 818. Alternatively or additionally, at least some of the operations in the communication technique may be implemented in a physical layer, such as hardware in interface circuit 818. In some embodiments, the communication technique is implemented, at least in part, in a MAC layer and/or in a physical layer in interface circuit 818.

While examples of numerical values are provided in the preceding discussion, in other embodiments different numerical values are used. Consequently, the numerical values provided are not intended to be limiting.

In the preceding description, we refer to 'some embodiments.' Note that 'some embodiments' describes a subset of all of the possible embodiments, but does not always specify the same subset of embodiments.

The foregoing description is intended to enable any person skilled in the art to make and use the disclosure, and is provided in the context of a particular application and its requirements. Moreover, the foregoing descriptions of embodiments of the present disclosure have been presented for purposes of illustration and description only. They are not intended to be exhaustive or to limit the present disclosure to the forms disclosed. Accordingly, many modifications and variations will be apparent to practitioners skilled in the art, and the general principles defined herein may be applied to other embodiments and applications without departing from the spirit and scope of the present disclosure. Additionally, the discussion of the preceding embodiments is not intended to limit the present disclosure. Thus, the present disclosure is not intended to be limited to the embodiments shown, but is to be accorded the widest scope consistent with the principles and features disclosed herein.

What is claimed is:

1. An electronic device, comprising:
   one or more nodes configured to communicatively couple to one or more antennas; and
   an interface circuit, communicatively coupled to the one or more nodes, configured to communicate with a second electronic device, and configured to:
      receive samples of wireless signals in a time interval, wherein the wireless signals are associated with the second electronic device;
      generate, based at least in part on the samples and a number of paths in a channel in a wireless environment of the electronic device, a signal spectrum corresponding to a set of estimated wireless-communication parameters;
      select a lower wireless-communication parameter in the set of wireless-communication parameters, the lower wireless-communication parameter having an associated regression model with a fit to the signal spectrum that exceeds a statistical confidence threshold; and
      identify, based at least in part on the selected lower wireless-communication parameter, one or more samples of a wireless signal associated with a line of sight between the electronic device and the second electronic device.

2. The electronic device of claim 1, wherein the one or more samples include a single instance of one or more multipath signals associated with the number of paths.

3. The electronic device of claim 1, wherein the estimated wireless-communication parameters include at least one of: a time of arrival of the wireless signals, an angle of arrival of the wireless signals, or an amplitude of the wireless signals.

4. The electronic device of claim 1, wherein the set of estimated wireless-communication parameters is generated based at least in part on a moving-average covariance matrix of channel estimates that are associated with the samples.

5. The electronic device of claim 4, wherein the moving average is computed forward and backward in time.

6. The electronic device of claim 4, wherein the signal spectrum is computed based at least in part on an eigenvalue decomposition of the moving-average covariance matrix.

7. The electronic device of claim 6, wherein the signal spectrum is further based at least in part on multiple signal classification (MUSIC) analysis of the eigenvectors determined in the eigenvalue decomposition.

8. The electronic device of claim 1, wherein the wireless-communication parameter is selected from the set of wireless-communication parameters based at least in part on hypothesis testing.

9. The electronic device of claim 1, wherein the communication with the second electronic device involves ultra-wide-band communication.

10. The electronic device of claim 1, wherein the interface circuit is configured to determine a distance between the electronic device and the second electronic device based at least in part on the identified one or more samples.

11. A non-transitory computer-readable storage medium for use in conjunction with an electronic device, the computer-readable storage medium storing program instructions that, when executed by processing circuitry included in the electronic device, cause the electronic device to identify a wireless signal associated with a line of sight between the electronic device and a second electronic device by carrying out one or more operations comprising:
   receiving samples of ultrawide-band wireless signals in a time interval, wherein the ultrawide-band wireless signals are associated with the second electronic device;
   generating, based at least in part on the samples and a wireless environment of the electronic device, a signal spectrum corresponding to a set of estimated wireless-communication parameters;
   selecting a lower wireless-communication parameter in the set of estimated wireless-communication parameters, the lower wireless-communication parameter having an associated regression model with a fit to the signal spectrum that exceeds a statistical confidence threshold; and
   identifying, based at least in part on the selected lower wireless-communication parameter, one or more samples of a wireless signal in the wireless signals associated with the line of sight between the electronic device and the second electronic device.

12. The computer-readable storage medium of claim 11, wherein the samples include single instances of one or more multipath signals associated with a number of paths in the wireless environment.

13. The computer-readable storage medium of claim 11, wherein the estimated wireless-communication parameters include at least one of: a time of arrival of the wireless signals, an angle of arrival of the wireless signals, or an amplitude of the wireless signals.

14. The computer-readable storage medium of claim 11, wherein the set of estimated wireless-communication parameters is based at least in part on a moving-average covariance matrix of channel estimates.

15. The computer-readable storage medium of claim 14, wherein the moving average covariance matrix is computed forward and backward in time.

16. The computer-readable storage medium of claim 14, wherein the signal spectrum is computed based at least in part on an eigenvalue decomposition of the moving-average covariance matrix.

17. The computer-readable storage medium of claim 16, wherein the signal spectrum is further based at least in part on multiple signal classification (MUSIC) analysis of the eigenvectors determined in the eigenvalue decomposition.

18. The computer-readable storage medium of claim 11, wherein the wireless-communication parameter is selected from the set of estimated wireless-communication parameters based at least in part on hypothesis testing.

19. The computer-readable storage medium of claim 11, wherein the one or more operations comprise determining a distance between the electronic device and the second electronic device based at least in part on the identified one or more samples.

20. A method for identifying a wireless signal associated with a line of sight between an electronic device and a second electronic device, comprising:
   by the electronic device:
      receiving samples of wireless signals in a time interval, wherein the wireless signals are associated with the second electronic device;
      generating, based at least in part on the samples and a number of paths in a channel in a wireless environment of the electronic device, a signal spectrum corresponding to a set of estimated wireless-communication parameters, wherein the samples reflect single instances of one or more multipath signals associated with the number of paths;
      selecting a lower wireless-communication parameter in the set of estimated wireless-communication parameters, the lower wireless-communication parameter having an associated regression model with a fit to the signal spectrum that exceeds a statistical confidence threshold; and
      identifying, based at least in part on the selected lower wireless-communication parameter, one or more samples of the wireless signal in the wireless signals associated with the line of sight between the electronic device and the second electronic device.

* * * * *